March 11, 1947.  E. C. HARTLEY ET AL  2,417,196

MACHINE FOR TESTING HELICAL COMPRESSION SPRINGS

Filed Nov. 10, 1943  3 Sheets-Sheet 1

Inventors
Emmett C. Hartley
and Herbert L. Ivins

By Mason Porter & Diller
Attorneys

March 11, 1947.  E. C. HARTLEY ET AL  2,417,196

MACHINE FOR TESTING HELICAL COMPRESSION SPRINGS

Filed Nov. 10, 1943  3 Sheets-Sheet 2

Inventors
Emmett C. Hartley
and Herbert L. Ivins

By Mason, Porter & Diller
Attorneys

March 11, 1947.  E. C. HARTLEY ET AL  2,417,196
MACHINE FOR TESTING HELICAL COMPRESSION SPRINGS
Filed Nov. 10, 1943  3 Sheets-Sheet 3
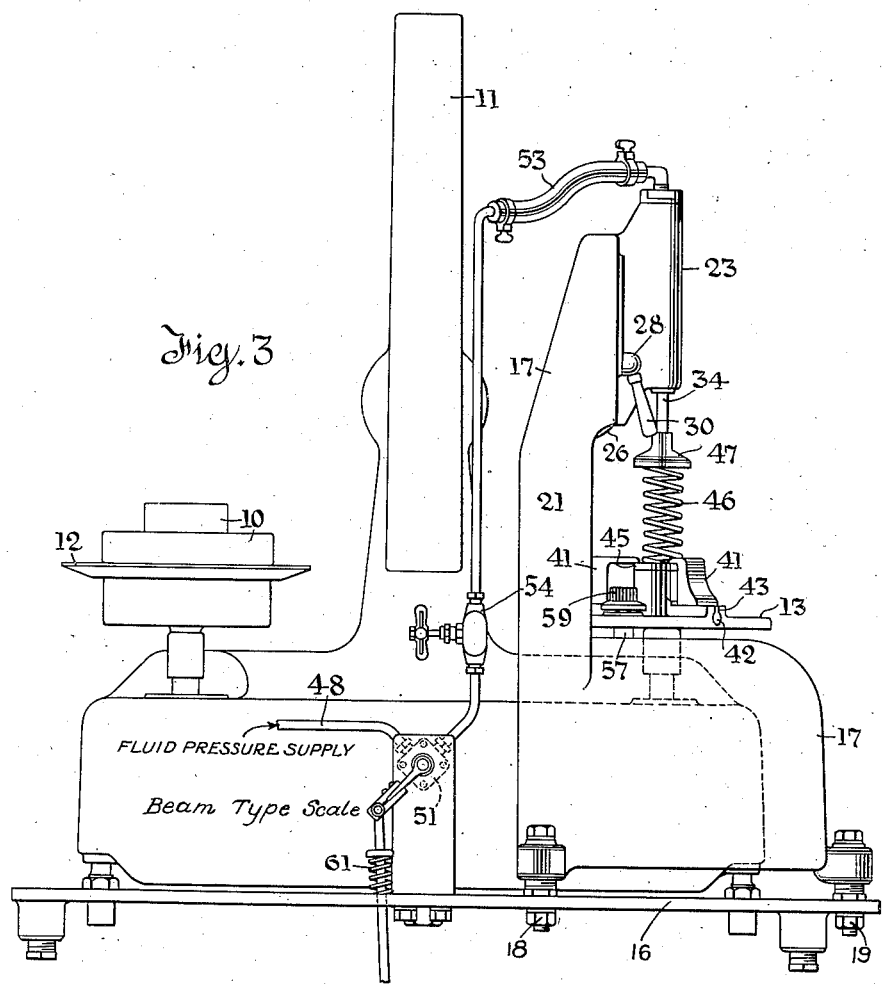
Fig. 3
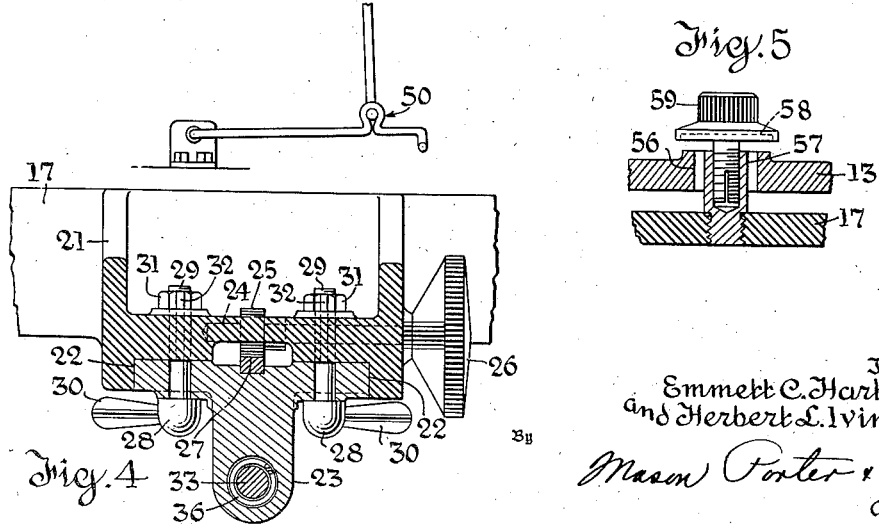
Fig. 4
Fig. 5
Inventors
Emmett C. Hartley
and Herbert L. Ivins
Mason, Porter & Diller
Attorneys Patented Mar. 11, 1947

2,417,196

UNITED STATES PATENT OFFICE 2,417,196

MACHINE FOR TESTING HELICAL COMPRESSION SPRINGS

Emmett C. Hartley and Herbert L. Ivins, Cleveland, Ohio, assignors to The Parker Appliance Company, Cleveland, Ohio, a corporation of Ohio Application November 10, 1943, Serial No. 509,748

1 Claim. (Cl. 73—161)

The invention relates to a machine for testing helical compression springs.

It is desirable that helical compression springs, when used in valves and similar devices and compressed to a given length, shall exert an expansive force which is uniform within certain limits. It is well known that helical springs although formed on the same automatic machine may not be uniform as to expansive force when compressed to a given length owing to slight variations in wire size, free length, coil diameter and method of heat treatment.

An object of the invention is to provide a machine for testing springs of the above type to determine whether a given load will compress the springs to substantially the same predetermined overall length.

A further object of the invention is to provide a machine of the above type which can be readily adjusted for testing springs of different lengths and under different load conditions.

These and other objects of the invention will be apparent from the following description and drawings wherein:

Figure 3 is a complete side elevation of the machine.

Figure 4 is a detail sectional view taken on line IV—IV of Figure 2, and

Figure 5 is a detail sectional view of a stop used for preventing over-travel of the weighing scale.

Figure 1:
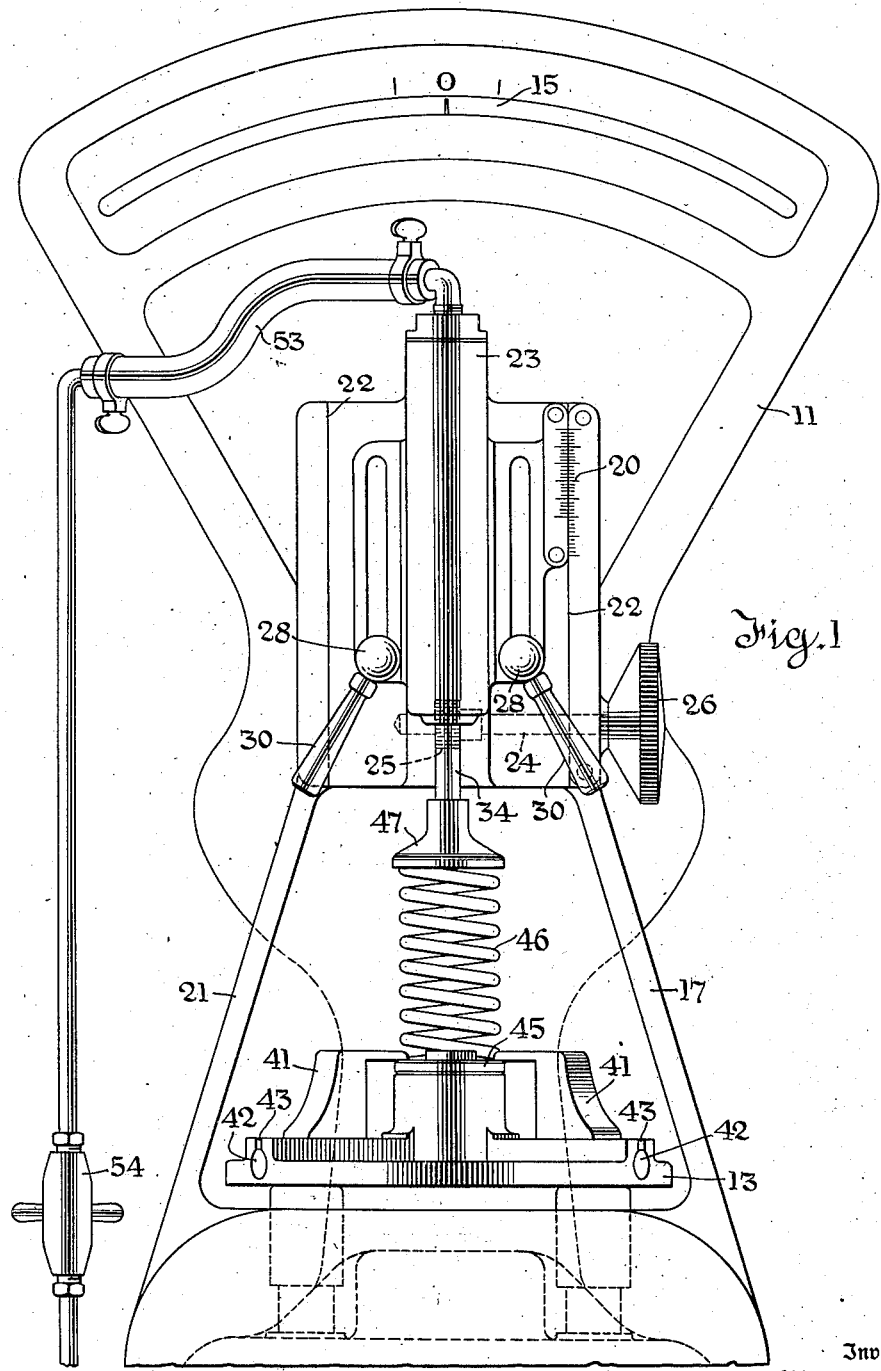
Figure 1 is a front elevation view of our improved spring testing machine.

Referring to the drawings for a detailed description of the invention, numeral 11 designates an ordinary weighing scale comprising a platform 12 for various weights 10, a balance table 13 and a visible scale 15. The weighing scale 11 and a frame member 17 are rigidly attached to a base 16 by studs 18 and 19 respectively.

Figure 2:
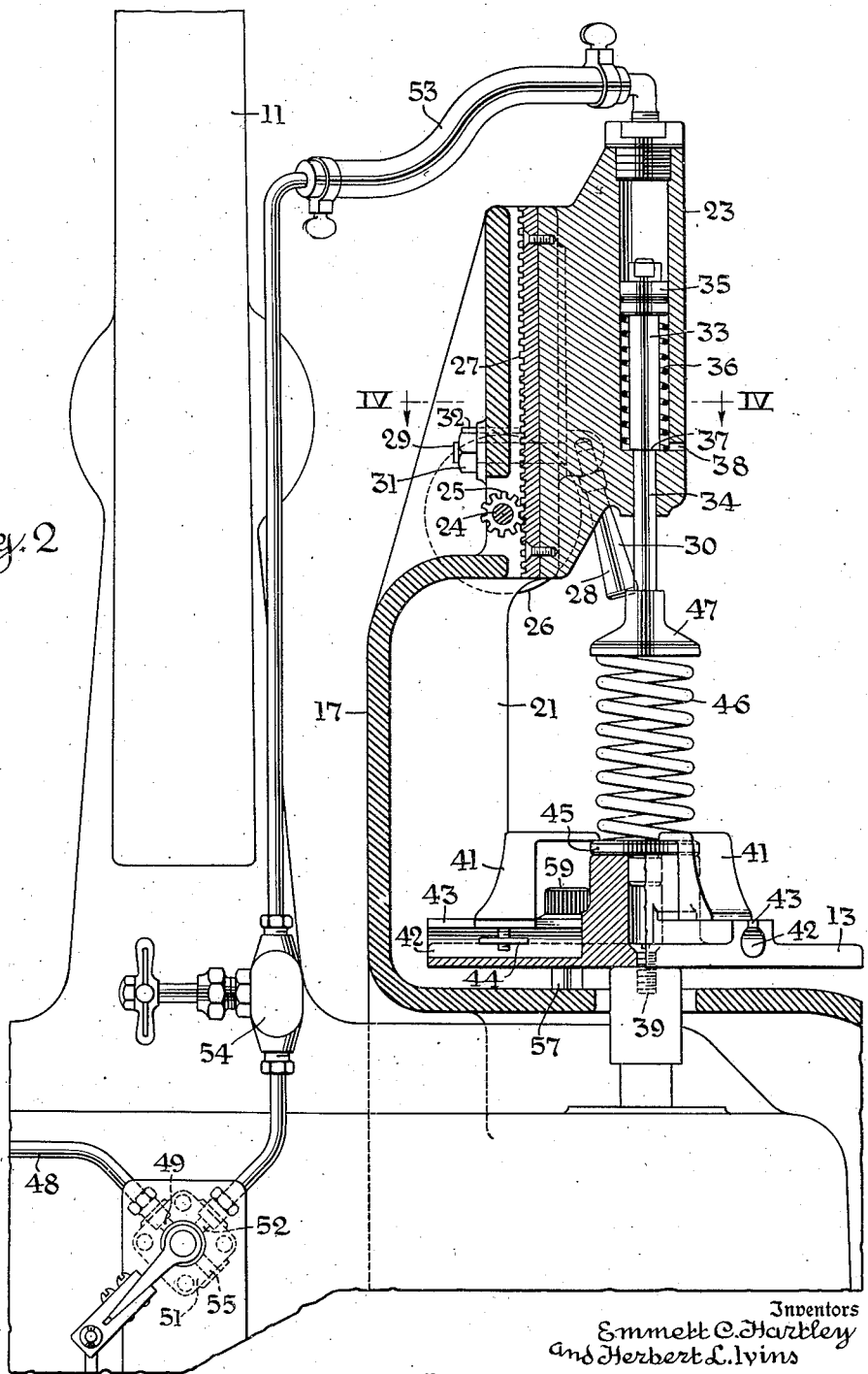
Figure 2 is a partial side elevation view, partly in section, of the machine shown in Figure 1.

The frame member 17 includes a vertical portion 21 which is provided with guideways 22 for slidably receiving a ram cylinder 23. Mounted in the vertical portion 21 of the frame 17 is a rotatable shaft 24 carrying a pinion 25, a knob 26 being connected to the shaft 24 for rotating the same. The pinion 25 engages a rack 27 which is rigidly connected to the cylinder 23. Rotation of the pinion 25 raises or lowers the cylinder 23 with respect to the balance table 13. The cylinder 23 and guideways 22 are provided with a vernier scale indicated at 20 in Figure 1, and a pair of locking devices 28 maintain the cylinder 23 in the desired position. As shown in Figures 2 and 4, the locking devices 28 each comprises a bolt 29, a handle 30 and a hexagonal nut 31 which is prevented from rotating by a pin 32.

As shown in Figure 2, the cylinder 23 has mounted therein a piston assembly 33 comprising a piston rod 34, a piston 35 and a spring 36 to return the piston to its upper position when fluid pressure on the top of the piston is released. A shoulder 37 is provided on the piston rod 34 to limit its downward movement when fluid pressure is applied to the top thereof. A relief port 38 permits air in the cylinder to escape when the piston 35 descends. This piston rod 34 carries a head 47 which is adapted to engage one end of a spring to be tested and serves as a compression member movable to and from a set position determined by the shoulder 37.

The balance table for work support 13 on which the spring is supported for testing, is mounted on the scale beam by screws 39. The spring supporting table 13 has three radial grooves therein in which three fingers 41 are slidably mounted. The radial grooves comprise drilled holes 42 and slots 43 and a flat spring member 44 yieldably retains the fingers 41 at any particular set position. A flat disk member 45 is mounted on the top of the work table 13 and the lower end of a helical compression spring to be tested, indicated at 46, contacts the disk member. This table 13 is raised by the weights 10 and will be depressed when the spring is compressed by the member 47, and serves as a load-reaction member.

The pneumatic circuit for controlling movement of the piston includes a fluid pressure supply line 48 connected to one port 49 of a three port plug valve 51. A second port 52 is connected through a flexible hose 53 and a needle control valve 54 to the top of the cylinder 23. The needle valve is adjustable to control the air pressure on the piston 35. A third port 55 is connected to atmosphere to permit compressed air to escape from the top of the cylinder 23 so the spring 36 will raise the piston 35. The plug valve 51 is preferably operated by means of a foot treadle 50, a spring 61 returning the valve to its original position.

The work table 13 has two holes 56 through which studs 57 pass. Cork washers 58 are attached to the bottom of knurled heads 59 on the stud 57 to arrest the upward movement of the work table 13 when the air pressure on the piston 35 is released, so that the unbalanced condition will not cause shocking or damage to the scale mechanism.

In operating the machine to test springs, the fingers 41 are first positioned to approximately the outside diameter of the spring to be tested. This locates the spring 46 directly under the head 47 carried by the piston rod 34. The cylinder 23 is then adusted to the correct compressed length of the particular spring to be tested, the vernier scale being graduated to read the distance between the disk 45 and the plunger head 47 when the piston rod 34 is in its lowest position and the scale is balanced on the "0."

Weights 10 are then placed on the platform 12 to balance the work table 13 plus the weight of one spring. After the scale has been balanced, weignts 10 are added on platform 12 to correspond to the particular load under which the spring is to be compressed. After these adjustments have been made, the fluid supply is connected to the top of the cylinder 23 by operating the plug valve 51 to connect port 52 with the fluid supply so that the piston 35 is forced to its lowermost position, air beneath the piston being exhausted through port 38.

If the spring being tested exerts exactly the amount of force it should when compressed to a predetermined length, the balance scale indicator will be at the "0." Under these conditions, a given load compresses the spring to a desired standard length. If the indicator goes beyond the tolerance limit toward the right, then the spring is too stiff. In this case, the distance between the compression member 47 and the load-exerting disk 45 is greater than the setting on the vernier scale. On the other hand, if the indicator needle goes to the left of the "0," then the given load has compressed the spring to less than the standard length, indicating that the spring is too weak. In other words, the distance between the compression head 47 and the disk 45 is less than the vernier setting.

After the spring has been tested, the treadle is released and a spring 61 associated therewith turns the valve 51 to connect ports 52 and 55 to permit the air in the cylinder 23 to exhaust to atmosphere. The spring 36 returns the piston 35 to its initial position. Once the machine is adjusted, several hundred or thousands of springs may be quickly tested, classified, passed or rejected.

The marking of the scale can be effected in two ways as follows:

(1) If a spring must compress to 2" plus or minus .100 under a load of 25 pounds, for example, then a mark is made on either side of the "0" mark on the indicator needle scale corresponding to .100" upward and .100" downward movement of the balance table from a balanced condition. Then, any spring tested is satisfactory if the needle is between these marks when a load of 25 pounds is applied.

(2) If a spring compressed to 2.000" must exert an expansive force of 25 pounds plus or minus 2 pounds, then maximum and minimum marks on the indicator needle scale apply only to the particular group of springs being tested. To calibrate the scale in this manner a sample spring is tested and if the needle is at "0," then 2 pounds weight is added and subtracted and marks made on either side of the "0." If the sample spring from which the marks are to be made does not bring the needle to "0" at 25 pounds, then it is only necessary to add or subtract enough weights to bring it to "0" and to note how much and then to extrapolate or interpolate to get the plus and minus 2 pounds specified. Then, any spring of this group is satisfactory if the needle is between these marks when a load of 25 pounds is applied. In other words, in the particular example given, some load between 23 and 27 pounds will compress the spring to exactly 2.000" even though 25 pounds does not.

It is obvious that other resilient objects in addition to helical coiled springs may be tested by utilizing this machine. Furthermore, the machine is very simple in construction and operation and is adapted to test large numbers of springs of various sizes and characteristics on a production basis without the use of skilled labor.

Although only one embodiment of this invention is illustrated and described, it is obvious that various modifications and variations may be made without departing from the spirit and scope of the invention and, therefore, it is desired to be limited only by the following claim.

We claim:

A machine for testing helical compression springs comprising a movable load-reaction member engaging one end of said spring, a supporting frame disposed above said load-reaction member, a cylinder mounted on said supporting frame, a piston movable in said cylinder, a head connected to said piston and adapted to engage the other end of said spring for compressing the same against the load-reaction member, means for admitting fluid above said piston, means carried by the piston for limiting the downward movement of the piston, means whereby the cylinder may be shifted to different set positions for testing springs of different lengths, and an indicating means associated with said load-reaction member for indicating the overall length of the spring being compressed by a given load relative to a desired standard length of spring compressed by said given load.

EMMETT C. HARTLEY.
HERBERT L. IVINS.

REFERENCES CITED

The following references are of record in the file of this patent:

UNITED STATES PATENTS

| Number | Name | Date |
|---|---|---|
| 1,921,793 | Thelander | Aug. 8, 1933 |
| 2,018,593 | Arthuis | Oct. 22, 1935 |
| 2,049,644 | Essen | Aug. 4, 1936 |
| 2,088,372 | Gogan | July 27, 1937 |
| 2,170,197 | Gumprich | Aug. 22, 1939 |
| Re. 21,242 | Bitzer et al. | Oct. 24, 1939 |
| 1,874,780 | McGuckin | Aug. 30, 1932 |
| 1,908,412 | Domina | May 9, 1933 |
| 2,241,794 | Stull | May 13, 1941 |
| 1,650,736 | Zelov | Nov. 29, 1927 |

FOREIGN PATENTS

| Number | Country | Date |
|---|---|---|
| 400,442 | German | Aug. 9, 1924 |